(12) United States Patent
Lin (10) Patent No.: US 10,732,482 B2
(45) Date of Patent: Aug. 4, 2020

(54) LIQUID CRYSTAL LENS AND MANUFACTURING METHOD THEREOF, AND DISPLAY DEVICE

(71) Applicant: BOE TECHNOLOGY GROUP CO., LTD., Beijing (CN)

(72) Inventor: Chia Chiang Lin, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 15/103,151

(22) PCT Filed: Oct. 19, 2015

(86) PCT No.: PCT/CN2015/092155
§ 371 (c)(1),
(2) Date: Jun. 9, 2016

(87) PCT Pub. No.: WO2016/201835
PCT Pub. Date: Dec. 22, 2016

(65) Prior Publication Data
US 2017/0131614 A1    May 11, 2017

(30) Foreign Application Priority Data
Jun. 18, 2015    (CN) .......................... 2015 1 0342539

(51) Int. Cl.
*G02F 1/29* (2006.01)
*G02F 1/1337* (2006.01)
*G02F 1/1343* (2006.01)

(52) U.S. Cl.
CPC .......... *G02F 1/29* (2013.01); *G02F 1/133753* (2013.01); *G02F 2001/133757* (2013.01);
(Continued)

(58) Field of Classification Search
None
See application file for complete search history.

(56) References Cited

U.S. PATENT DOCUMENTS

| 8,860,894 B2 | 10/2014 | Kim et al. |
| 9,235,103 B2 | 1/2016 | Liu et al. |

(Continued)

FOREIGN PATENT DOCUMENTS

| CN | 202600323 U | 12/2012 |
| CN | 202870434 U | 4/2013 |

(Continued)

OTHER PUBLICATIONS

Second Chinese Office Action in Chinese Application No. 201510342539.X, dated Dec. 28, 2017 with English translation.

(Continued)

*Primary Examiner* — Edward J Glick
*Assistant Examiner* — David Y Chung
(74) *Attorney, Agent, or Firm* — Collard & Roe, P.C.

(57) ABSTRACT

A liquid crystal lens and a manufacturing method thereof, and a display device are provided. The liquid crystal lens includes: an upper substrate, a lower substrate, a liquid crystal layer arranged between the upper substrate and the lower substrate; at least one first electrode arranged at a side, close to the liquid crystal layer, of the upper substrate; and at least one second electrode and at least one third electrode which are arranged at a side, close to the liquid crystal layer, of the lower substrate. The liquid crystal layer includes a first region over the second electrode and a second region over the third electrode. Liquid crystals in both the first region and the second region have a tilted angle, and alignment directions of the liquid crystals in the first region and the second region are opposite to each other.

19 Claims, 3 Drawing Sheets

(52) U.S. Cl.
CPC ............ *G02F 2001/133761* (2013.01); *G02F 2001/134381* (2013.01); *G02F 2001/294* (2013.01)

(56) References Cited

U.S. PATENT DOCUMENTS

| | | | |
|---|---|---|---|
| 9,366,909 B2 | 6/2016 | Naganuma et al. | |
| 9,575,387 B2 | 2/2017 | Wang et al. | |
| 2003/0043336 A1* | 3/2003 | Sasaki | G02F 1/133788 349/187 |
| 2005/0280761 A1* | 12/2005 | Ishii | G02F 1/133707 349/130 |
| 2010/0302491 A1* | 12/2010 | Usui | G02F 1/133711 349/129 |
| 2013/0329151 A1* | 12/2013 | Ma | G02F 1/133711 349/42 |
| 2014/0071393 A1 | 3/2014 | Chen | |
| 2015/0146115 A1 | 5/2015 | Liao et al. | |
| 2016/0018680 A1* | 1/2016 | Wang | G02F 1/29 349/33 |
| 2016/0357023 A1 | 12/2016 | Wang et al. | |

FOREIGN PATENT DOCUMENTS

| | | |
|---|---|---|
| CN | 103091930 A | 5/2013 |
| CN | 103257506 A | 8/2013 |
| CN | 103336398 A | 10/2013 |
| CN | 103399444 A | 11/2013 |
| CN | 103744248 A | 4/2014 |
| CN | 103809328 A | 5/2014 |
| CN | 203858434 U | 10/2014 |
| CN | 104570542 A | 4/2015 |
| CN | 104678560 A | 6/2015 |
| CN | 104865771 A | 8/2015 |
| JP | H06-43462 A | 2/1994 |
| KR | 10-2011-0077709 A | 7/2011 |

OTHER PUBLICATIONS

Chinese Office Action in Chinese Application No. 201510342539.X, dated May 2, 2017 with English translation.
International Search Report of PCT/CN2015/092155 in Chinese, dated Mar. 24, 2016 with English translation.
Notice of Transmittal of the International Search Report of PCT/CN2015/092155 in Chinese, dated Mar. 24, 2016.
Written Opinion of the International Searching Authority of PCT/CN2015/092155 in Chinese, dated Mar. 24, 2016 with English translation.
Jeong, Il Hwa et al. "Improving profile of multi-electrode Fresnel-type liquid crystal lens utilizing local control of pretilt angle," Japanese Journal of Applied Physics, 53, 068003 (2014), pp. 068003-1-068003-3.

* cited by examiner

FIG.2 providing an upper substrate; providing a lower substrate arranged to be opposite to the upper substrate; providing a liquid crystal layer between the upper substrate and the lower substrate; forming at least one first electrode at a side, close to the liquid crystal layer, of the upper substrate; and forming at least one second electrode and at least one third electrode at a side, close to the liquid crystal layer, of the lower substrate, with the liquid crystal layer on the second electrode forming a first region and the liquid crystal layer on the third electrode forming a second region — S31 allowing liquid crystals in the first region and liquid crystals in the second region to form tilted angles larger than 0 degree, and allowing an alignment direction of the liquid crystals in the first region to be opposite to an alignment direction of the liquid crystals in the second region — S32

LIQUID CRYSTAL LENS AND MANUFACTURING METHOD THEREOF, AND DISPLAY DEVICE

CROSS REFERENCE TO RELATED APPLICATIONS

This application is the National Stage of PCT/CN2015/092155 filed on Oct. 19, 2015, which claims priority under 35 U.S.C. § 119 of Chinese Application No. 201510342539.X filed on Jun. 18, 2015, the disclosure of which is incorporated by reference.

TECHNICAL FIELD

The present disclosure pertains to a liquid crystal lens, a display device, and a manufacturing method of the liquid crystal lens.

BACKGROUND

A liquid crystal lens achieves a focusing effect with a liquid crystal layer being driven by application of voltage. The smoother the distribution curve of the actual refractive index of the liquid crystal layer of the liquid crystal lens, the better the focusing property of the liquid crystal lens is. Therefore, the method of controlling the actual refractive index of the liquid crystal layer by application of voltage determines the image quality of the liquid crystal lens.

However, it is known to the inventor that liquid crystals are generally driven by using a multi-electrode method. In the multi-electrode method, because lateral voltages are generated at edges of electrodes, the refractive indexes, at the edges of the electrodes, of the liquid crystal molecules undergoes a large change, thus the spatial distribution curve of the refractive index of the liquid crystals becomes not smooth, and this causes the focusing property of the liquid crystal lens degraded.

SUMMARY

In view of the above, embodiments of the present disclosure provide a liquid crystal lens, a display device and a manufacturing method of the liquid crystal lens, which can produce a smooth refractive index profile to make the liquid crystal lens have good focusing performance.

In a first aspect of the disclosure, a liquid crystal lens is provided and includes: an upper substrate; a lower substrate, arranged to be opposite to the upper substrate; a liquid crystal layer, arranged between the upper substrate and the lower substrate; at least one first electrode, arranged at a side, close to the liquid crystal layer, of the upper substrate; and at least one second electrode and at least one third electrode, which are arranged at a side, close to the liquid crystal layer, of the lower substrate. The liquid crystal layer over the second electrode forms a first region, the liquid crystal layer over the third electrode forms a second region, a tilted angle of liquid crystals in the first region and a tilted angle of liquid crystals in the second region are larger than 0 degree, and an alignment direction of the liquid crystals in the first region and an alignment direction of the liquid crystals in the second region are opposite to each other.

In an alternative embodiment, the second electrode and the third electrode are spaced from each other, the liquid crystal lens includes two edges which are opposite to each other, at least one second electrode is arranged at one edge of the two edges, and at least one third electrode is arranged at the other edge of the two edges.

In an alternative embodiment, the tilted angle of the liquid crystals in the first region and the tilted angle of the liquid crystals in the second region range from 8 degrees to 15 degrees.

In an alternative embodiment, the first region includes a first sub-region and a second sub-region, liquid crystals in the first sub-region have a first sub-tilted angle, liquid crystals in the second sub-region have a second sub-tilted angle, and the first sub-tilted angle is different from the second sub-tilted angle; and/or the second region includes a fourth sub-region and a fifth sub-region, liquid crystals in the fourth sub-region have a fourth sub-tilted angle, liquid crystals in the fifth sub-region have a fifth sub-tilted angle, and the fourth sub-tilted angle is different from the fifth sub-tilted angle.

In an alternative embodiment, in a situation where the first region includes the first sub-region and the second sub-region, the first region further includes a third sub-region which is a region adjacent to the first region, and liquid crystals in the third sub-region have a third sub-tilted angle which is different from the first sub-tilted angle and the second sub-tilted angle; and in a situation where the second region includes the fourth sub-region and the fifth sub-region, the second region further includes a sixth sub-region which is a region adjacent to the second region, and liquid crystals in the sixth sub-region have a sixth sub-tilted angle which is different from the fourth sub-tilted angle and the fifth sub-tilted angle.

In an alternative embodiment, an angle between the alignment direction of the liquid crystals in the first region and a length direction of an electrode ranges from 70 degrees to 90 degrees.

In an alternative embodiment, the liquid crystal layer further includes a third region below the first electrode, and liquid crystals in the third region are aligned horizontally.

In an alternative embodiment, a tilted angle of the liquid crystals in the third region ranges from 0 degree to 3 degrees.

In an alternative embodiment, the liquid crystal lens further includes an alignment film, the alignment film covers the second electrode and the third electrode, or the alignment film covers a surface of the entire lower substrate.

In an alternative embodiment, liquid crystals of the liquid crystal layer are positive liquid crystals.

A second aspect of the disclosure provides a display device, which includes at least one liquid crystal lens according to the first aspect.

In an alternative embodiment, the display device includes a plurality of the liquid crystal lenses, and a distance between adjacent two of the liquid crystal lenses is from 8 μm to 20 μm.

A third aspect of the disclosure provides a manufacturing method of a liquid crystal lens, and the method includes: providing an upper substrate; providing a lower substrate arranged to be opposite to the upper substrate; providing a liquid crystal layer between the upper substrate and the lower substrate; forming at least one first electrode at a side, close to the liquid crystal layer, of the upper substrate; and forming at least one second electrode and at least one third electrode at a side, close to the liquid crystal layer, of the lower substrate, with the liquid crystal layer over the second electrode forming a first region and the liquid crystal layer over the third electrode forming a second region; and allowing liquid crystals in the first region and liquid crystals in the second region to form tilted angles larger than 0 degree, and allowing an alignment direction of the liquid crystals in the first region to be opposite to an alignment direction of the liquid crystals in the second region.

In an alternative embodiment, allowing the liquid crystals in the first region and the liquid crystals in the second region to form tilted angles includes: performing an optical process to a liquid crystal layer region between the first electrode and the second electrode, so that the liquid crystals in the first region form a first tilted angle in a situation of no voltage; and performing an optical process to a liquid crystal layer region between the first electrode and the third electrode, so that the liquid crystals in the second region form a second tilted angle in a situation of no voltage.

In an alternative embodiment, the operation of performing the optical process to the liquid crystal layer region between the first electrode and the second electrode, so that the liquid crystals in the first region form the first tilted angle in the situation of no voltage, includes the following steps: applying a voltage to each of the second electrode and the first electrode, and applying a first voltage to the liquid crystal layer which is in an original state, so that liquid crystals in the liquid crystal layer tilt at the first tilted angle, the voltage applied to the second electrode being larger than the voltage applied to the first electrode, so that a voltage difference is generated between the first electrode and the second electrode; and irradiating the liquid crystal layer region between the first electrode and the second electrode by ultraviolet light, so that the liquid crystals in the first region form the first tilted angle in the situation of no voltage.

In an alternative embodiment, the operation of performing the optical process to the liquid crystal layer region between the first electrode and the third electrode, so that the liquid crystals in the second region form the second tilted angle in the situation of no voltage, includes the following steps: applying a voltage to each of the third electrode and the first electrode, and applying a second voltage to the liquid crystal layer which is in an original state, so that liquid crystals in the liquid crystal layer tilt at the second tilted angle, the voltage applied to the third electrode being larger than the voltage applied to the first electrode, so that a voltage difference is generated between the first electrode and the third electrode; and irradiating the liquid crystal layer region between the first electrode and the third electrode by ultraviolet light, so that the liquid crystals in the second region form the second tilted angle in the situation of no voltage.

In an alternative embodiment, in a situation where the liquid crystal layer region between the first electrode and the second electrode includes at least two sub-regions, tilted angles of liquid crystals in the at least two sub-regions are different, the liquid crystal layer region between the first electrode and the second electrode includes a first sub-region and a second sub-region, the first sub-region forms a first sub-tilted angle, and the second sub-region forms a second sub-tilted angle, and the operation of performing the optical process to the liquid crystal layer region between the first electrode and the second electrode, so that the liquid crystals in the first region form the first tilted angle in the situation of no voltage, includes the following steps: applying a first sub-voltage to the liquid crystal layer which is in an original state, so that liquid crystals in the liquid crystal layer tilt at a first sub-tilted angle; irradiating the first sub-region by ultraviolet light, so that liquid crystals in the first sub-region form the first sub-tilted angle; applying a second sub-voltage to the liquid crystal layer, so that the liquid crystals in the liquid crystal layer tilt at a second sub-tilted angle; and irradiating the second sub-region by ultraviolet light, so that liquid crystals in the second sub-region form the second sub-tilted angle. And/or, in a situation where the liquid crystal layer region between the first electrode and the third electrode includes at least two sub-regions, tilted angles of liquid crystals in the at least two sub-regions are different, the liquid crystal layer region between the first electrode and the third electrode includes a fourth sub-region and a fifth sub-region, the fourth sub-region forms a fourth sub-tilted angle, and the fifth sub-region forms a fifth sub-tilted angle, and the operation of performing the optical process to the liquid crystal layer region between the first electrode and the third electrode, so that the liquid crystals in the second region form the second tilted angle in the situation of no voltage, includes the following steps: applying a fourth sub-voltage to the liquid crystal layer which is in an original state, so that liquid crystals in the liquid crystal layer tilt at a fourth sub-tilted angle; irradiating the fourth sub-region by ultraviolet light, so that liquid crystals in the fourth sub-region form the first sub-tilted angle; applying a fifth sub-voltage to the liquid crystal layer, so that the liquid crystals in the liquid crystal layer tilt at a fifth sub-tilted angle; and irradiating the fifth sub-region by ultraviolet light, so that liquid crystals in the fifth sub-region form the fifth sub-tilted angle.

In an alternative embodiment, in a situation where the at least two sub-regions between the first electrode and the second electrode are applied with different sub-voltages respectively, a third sub-region adjacent to the first region is applied with a third sub-voltage, and the third sub-region is irradiated by ultraviolet light so that liquid crystals in the third sub-region form a third sub-tilted angle; and in a situation where the at least two sub-regions between the first electrode and the third electrode are applied with different sub-voltages respectively, a sixth sub-region adjacent to the second region is applied with a sixth sub-voltage, and the sixth sub-region is irradiated by ultraviolet light so that liquid crystals in the sixth sub-region form a sixth sub-tilted angle.

In an alternative embodiment, upon the optical process being performed to the liquid crystals in the first region, the liquid crystals in the first region are allowed to react with an alignment film, so that the liquid crystals in the first region are capable of keeping the first tilted angle in a situation of no voltage; and upon the optical process being performed to the liquid crystals in the second region, the liquid crystals in the second region are allowed to react with an alignment film, so that the liquid crystals in the second region are capable of keeping the second tilted angle in a situation of no voltage.

In an alternative embodiment, the operation of performing the optical process to the liquid crystal layer region between the first electrode and the third electrode, so that the liquid crystals in the second region form the second tilted angle in the situation of no voltage, includes the following steps: applying a voltage to each of the third electrode and the first electrode, and applying a second voltage to the liquid crystal layer, so that liquid crystals in the liquid crystal layer tilt at the second tilted angle, wherein the voltage applied to the third electrode is larger than the voltage applied to the first electrode, so that a voltage difference is generated between the first electrode and the third electrode; and irradiating the liquid crystal layer region between the first electrode and the third electrode, so that the liquid crystals in the second region form the second tilted angle in the situation of no voltage.

In an alternative embodiment, the liquid crystal layer further includes a third region below the first electrode, and before the liquid crystals in the first region and the liquid crystals in the second region form the tilted angles, the method further includes: allowing liquid crystals in the third region to align horizontally.

According to the liquid crystal lens, the display device and the manufacturing method thereof provided by the embodiments of the present disclosure, a side, close to the liquid crystal layer, of the upper substrate is provided with at least one first electrode; a side, close to the liquid crystal layer, of the lower substrate is provided with at least one second electrode and at least one third electrode, the liquid crystal layer over the second electrode forms the first region, the liquid crystal layer over the third electrode forms the second region, liquid crystals in each of the first region and the second region form a tilted angle larger than 0 degree, and the alignment direction of the liquid crystals in the first region is opposite to the alignment direction of the liquid crystals in the second region. In the voltage driving, by the tilted angles predetermined in the first region and the second region of the liquid crystal layer and the elasticity of the liquid crystals per se, the control of the refractive index profile (the refractive index distribution curve) of the liquid crystals can be achieved. Compared with the control method only relying on the elasticity of the liquid crystals per se only, the refractive index profile of liquid crystals of the liquid crystal lens provided by the present embodiments of the present disclosure becomes smoother, so that the liquid crystal lens can have better focusing performance.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and those skilled in the art can obtain other drawings according to these drawings without any inventive work.

DETAILED DESCRIPTION

The technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present application for disclosure, are not intended to indicate any sequence, amount or importance, but distinguish various components. Also, the terms such as "a," "an," etc., are not intended to limit the amount, but indicate the existence of at least one. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly. The thicknesses and shapes of all the thin films in the accompanying drawings do not reflect the real scale, the objective of which is merely to schematically describe the embodiments of the present disclosure.

First Embodiment

Figure 1:
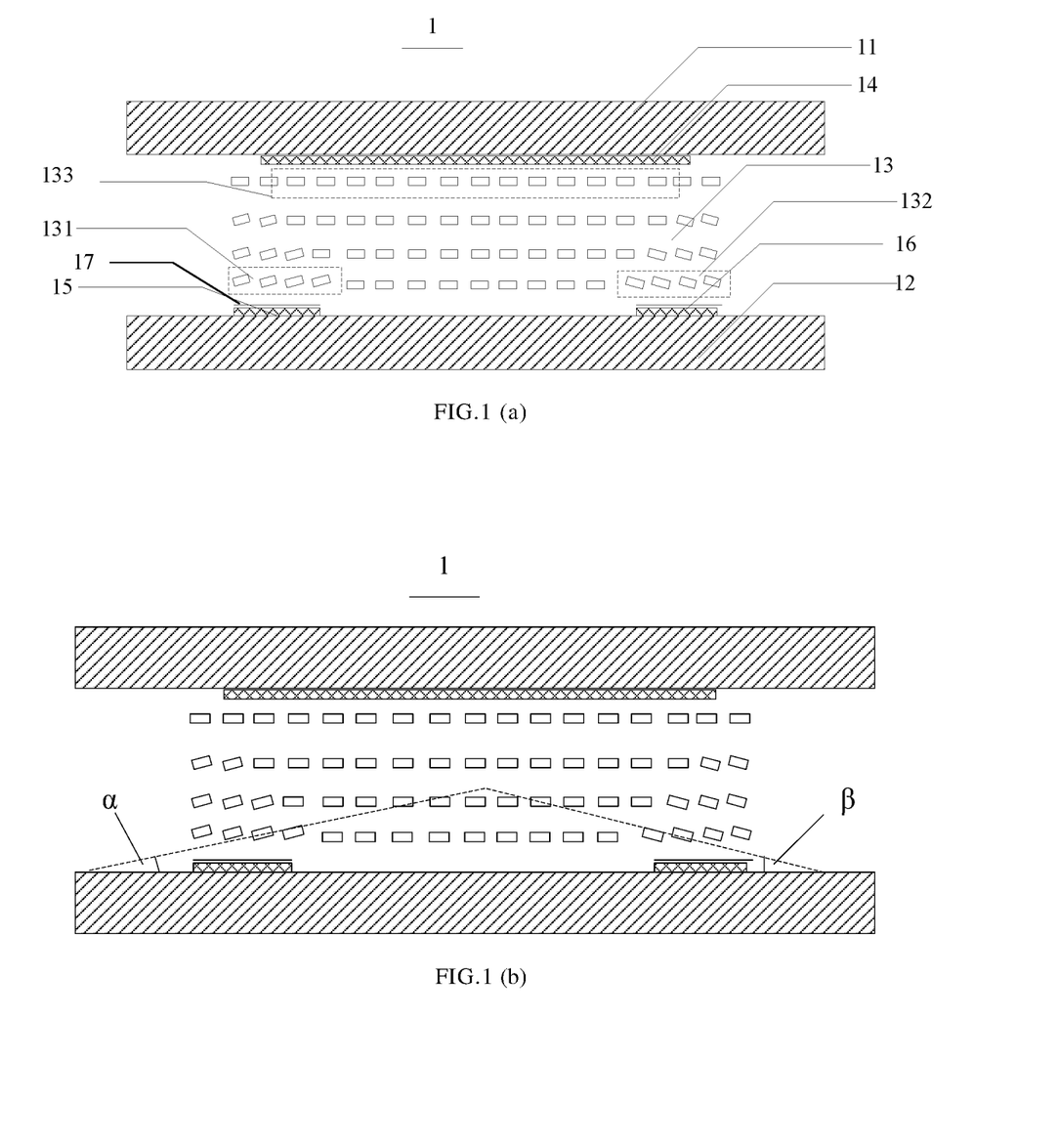
FIGS. 1(a) and 1(b) are respectively schematic structural views of a liquid crystal lens provided by a first embodiment of the present disclosure.

The first embodiment of the present disclosure provides a liquid crystal lens 1. As illustrated in FIG. 1(a), the liquid crystal lens 1 includes: an upper substrate 11, a lower substrate 12 arranged to be opposite to the upper substrate 11, and a liquid crystal layer 13 arranged between the upper substrate 11 and the lower substrate 12; at least one first electrode 14 is arranged at a side, close to the liquid crystal layer 13, of the upper substrate 11; and at least one second electrode 15 and at least one third electrode 16 are arranged at a side, close to the liquid crystal layer 13, of the lower substrate 12. The liquid crystal layer 13 includes a first region 131 over the second electrode 15 and a second region 132 over the third electrode 16. Liquid crystals in both the first region 131 and the second region 132 have a tilted angle larger than 0 degree, and an alignment direction of the liquid crystals in the first region 131 and an alignment direction of the liquid crystals in the second region 132 are opposite to each other.

It is to be noted that the tilted angle of the liquid crystals in the present application is defined as the angle between the long axis of the liquid crystals and the surface of the substrate 11. The liquid crystal molecules in the first region 131 have a same tilted angle in value as that in the second region 132, respectively. The alignment direction of the liquid crystals in the first region 131 is opposite to the alignment direction of the liquid crystals in the second region 132 can be understood as, after the liquid crystal molecules in the first region 131 and the second region 132 form a tilted angle through a pretilt angle forming process, the straight line in which the tilt direction of the liquid crystals in the first region 131 is located, the straight line in which the tilt direction of the liquid crystals in the second region 132 is located, and the longitudinal direction over the surface of the substrate form a triangle. As illustrated in FIG. 1(b), the angle between the straight line in which the alignment direction of the liquid crystals in the first region 131 at the second electrode 15 is located and the substrate is the angle α [alpha], the angle between the straight line in which the alignment direction of the liquid crystals in the second region 132 at the third electrode 16 is located and the substrate is the angle β [beta], and the angle α and the angle β are interior angles of the triangle as illustrated in FIG. 1(b).

According to the liquid crystal lens provided by the first embodiment of the present disclosure, different tilted angles are predetermined at preset regions of the liquid crystal layer. In voltage driving, by means of the tilted angles predetermined in the first region 131 and the second region 132 of the liquid crystal layer and the elasticity of the liquid crystals per se, the control on the refractive index profile (the refractive index distribution curve) of the liquid crystals can be achieved. Compared with the control method only relying on the elasticity of the liquid crystals per se only, the refractive index profile of liquid crystals of the liquid crystal lens provided by the first embodiment of the present disclosure is smoother, so that the liquid crystal lens can have better focusing performance. It is to be noted that, in the first embodiment of the disclosure, only in the voltage-driven state the lens property is presented, but without the voltage-driven state, the liquid crystal layer including the above electrode structure and the preset areas and having tilted angles presents no lens property.

In the above embodiment, the second electrode 15 and the third electrode 16 can be spaced from each other. The liquid crystal lens 1 includes two edges which are opposite to each other, at least one second electrode 15 can be arranged at one edge of the two edges of the liquid crystal lens 1, and at least one third electrode 16 can be arranged at the other edge of the two edges. The widths of the second electrode 15 and the third electrode 16, for example, can be arranged to be from 10 μm to 30 μm.

Furthermore, each first electrode 14 is arranged opposite to one second electrode 15 and one third electrode 16, so that voltage difference is generated between the each first electrode 14 and the opposite second electrode 15 and voltage difference is generated between the each first electrode 14 and the opposite third electrode 16 as well. This structure that only has electrodes (i.e., the second electrode 15 and the third electrode 16) respectively at the edges of the liquid crystal lens brings about a smoother refractive index profile of liquid crystals forming the lens in operation on one hand, and on the other hand greatly reduces the number of electrodes.

Alternatively, in an exemplary example of the disclosure, the tilted angle of the liquid crystals in the first region 131 and the tilted angle of the liquid crystals in the second region 132 can range, for example, from 8 degrees to 15 degrees. For example, as illustrated in FIG. 1(b), both the angle α between the straight line in which the tilt direction of the liquid crystals in the first region 131 is located and the substrate, and the angle β between the straight line in which the tilt direction of the liquid crystals in the second region 132 is located and the substrate are from 8 degrees to 15 degrees.

Generally, the tilted angle of the liquid crystals is small, e.g., in the range of 1-4 degrees. In the present embodiment of the disclosure, the liquid crystals in the first region 131 and the second region 132 can be provided with a large tilted angle, e.g., in the range of 8-15 degrees. The liquid crystals may be positive liquid crystals, and thus under action of an applied voltage, liquid crystal molecules are aligned along an electric field direction perpendicular to the surface of the electrode.

Alternatively, in order that the refractive index profile of liquid crystals of the liquid crystal lens is smoother, different voltages can be applied to the liquid crystals in the first region and/or in the second region to obtain different tilted angles. In an exemplary example of the disclosure, by applying different voltages in the first region 131 and/or the second region 132, the following three structures (not shown) may be formed.

1. The first region 131 includes a first sub-region and a second sub-region, liquid crystals in the first sub-region have a first sub-tilted angle, liquid crystals in the second sub-region have a second sub-tilted angle, and the first sub-tilted angle is different from the second sub-tilted angle.

2. The second region 132 includes a fourth sub-region and a fifth sub-region, liquid crystals in the fourth sub-region have a fourth sub-tilted angle, liquid crystals in the fifth sub-region have a fifth sub-tilted angle, and the fourth sub-tilted angle is different from the fifth sub-tilted angle.

3. The first region 131 includes a first sub-region and a second sub-region, liquid crystals in the first sub-region have a first sub-tilted angle, liquid crystals in the second sub-region have a second sub-tilted angle, and the first sub-tilted angle is different from the second sub-tilted angle; and the second region 132 includes a fourth sub-region and a fifth sub-region, liquid crystals in the fourth sub-region have a fourth sub-tilted angle, liquid crystals in the fifth sub-region have a fifth sub-tilted angle, and the fourth sub-tilted angle is different from the fifth sub-tilted angle.

Furthermore, a voltage different from that applied to the first region or the second region can also be applied to an adjacent region to the first region or the second region. For example, in an exemplary example, in a situation where the first region 131 includes the first sub-region, the second sub-region, and a third sub-region and the third sub-region is a region adjacent to the first region, the liquid crystals in the first sub-region have the first sub-tilted angle, the liquid crystals in the second sub-region have the second sub-tilted angle, and liquid crystals in the third sub-region have a third sub-tilted angle which is different from the first sub-tilted angle and the second sub-tilted angle; and the second region includes the fourth sub-region, the fifth sub-region, and a sixth sub-region which is a region adjacent to the second region, the liquid crystals in the fourth sub-region have the fourth sub-tilted angle, the liquid crystals in the fifth sub-region have the fifth sub-tilted angle, and liquid crystals in the sixth sub-region have a sixth sub-tilted angle which is different from the fourth sub-tilted angle and the fifth sub-tilted angle.

Alternatively, in an exemplary example of the disclosure, the alignment direction of the liquid crystals in the first region 131 can be perpendicular to the length direction of an electrode, or an angle between the alignment direction of the liquid crystals in the first region 131 and the length direction of an electrode can range from 70 degrees to 90 degrees.

Alternatively, in an exemplary example, the liquid crystal layer 13 can further includes a third region 133 below the first electrode 14, and liquid crystals in the third region 133 are aligned horizontally.

For example, the first electrode 14 can be covered with a horizontal alignment film, and then a horizontal alignment is incurred to the liquid crystals in the third region 133, so that the liquid crystals in the third region 133 are aligned substantially horizontally.

In the above exemplary example, the ideal state of the alignment of the liquid crystals in the third region is "full horizontal alignment", but the liquid crystals in the second region below the third region is aligned only approximately horizontally, and for example, a tilted angle of the liquid crystals in the third region ranges from 0 degree to 3 degrees.

Alternatively, in an exemplary example, the liquid crystal lens can further include an alignment film 17, the alignment film 17 covers the second electrode 15 and the third electrode 16, or the alignment film 17 can further cover a surface of the entire lower substrate 12. The alignment film 17 can be formed by a polymer material such as polystyrene and its derivatives, polyvinyl alcohol, polyester, epoxy resin, polyurethanes, polysilanes, or polyimide.

Second Embodiment

Figure 2:
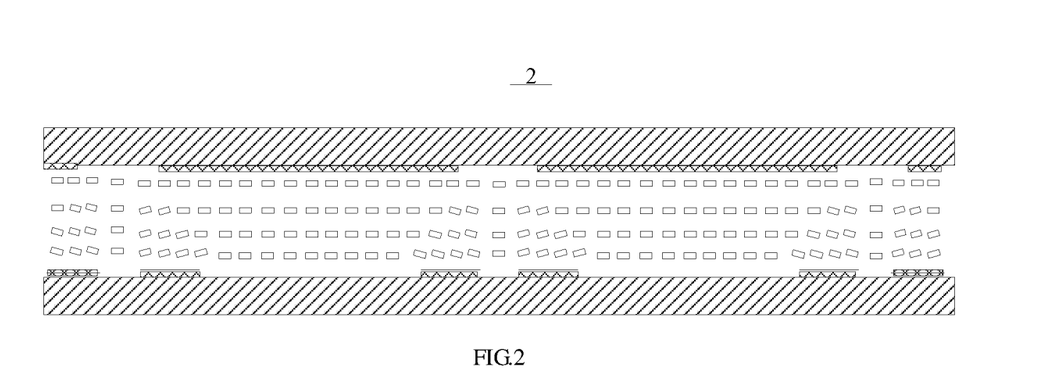
FIG. 2 is a schematic structural view of a display device provided by a second embodiment of the present disclosure.

The second embodiment of the disclosure provides a display device 2. As illustrated in FIG. 2, the display device 2 includes at least one liquid crystal lens 1 according to any one of the exemplary examples in the first embodiment.

In a situation where the display device 2 includes a plurality of the liquid crystal lens 1, a certain distance can be provided between two adjacent liquid crystal lenses, the distance is e.g., 8-20 µm, and in this way, it can be achieved that the disclination area of the liquid crystals is fixed at this region.

According to the display device provided by the second embodiment of the disclosure, the display device includes at least one liquid crystal lens according to any one of the exemplary examples in the first embodiment. In voltage driving, by means of the tilted angles predetermined in the first region and the second region of the liquid crystal layer and the elasticity of the liquid crystals per se, the control of the refractive index profile of liquid crystals can be achieved. Compared with the conventional control method only relying on the elasticity of the liquid crystals per se only, the refractive index profile of liquid crystals of the display device provided by the second embodiment of the present disclosure becomes smoother, so that the display device can have a better focusing performance.

Third Embodiment

Figure 3:
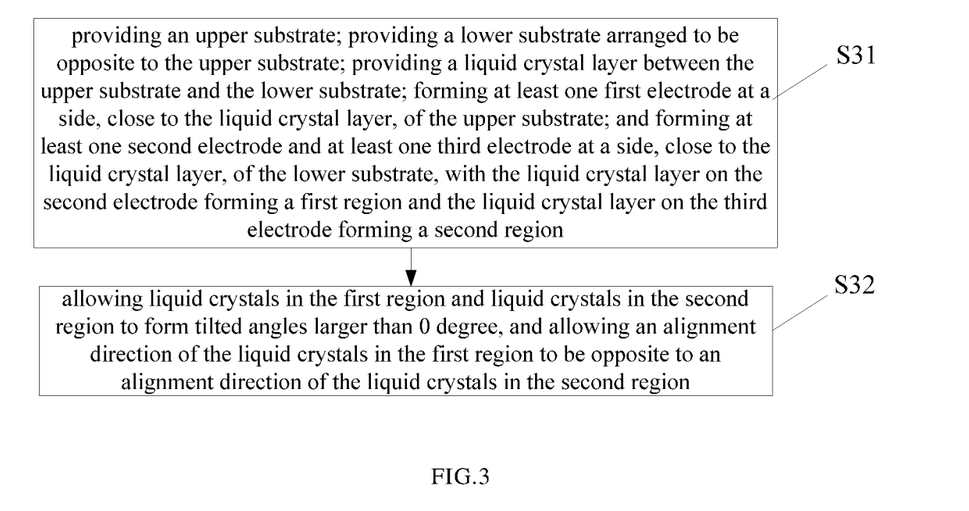
FIG. 3 is a schematic flow chart of a manufacturing method of a liquid crystal lens provided by a third embodiment of the present disclosure.

The third embodiment of the disclosure provides a manufacturing method of a liquid crystal lens, and as illustrated in FIG. 3, the manufacturing method includes the following steps: step S31, providing an upper substrate, providing a lower substrate arranged to be opposite to the upper substrate, providing a liquid crystal layer between the upper substrate and the lower substrate, forming at least one first electrode at a side, close to the liquid crystal layer, of the upper substrate, and forming at least one second electrode and at least one third electrode at a side, close to the liquid crystal layer, of the lower substrate, with the liquid crystal layer over the second electrode forming a first region and the liquid crystal layer over the third electrode forming a second region; and step S32, allowing liquid crystals in the first region and liquid crystals in the second region to form tilted angles larger than 0 degree, and allowing an alignment direction of the liquid crystals in the first region to be opposite to an alignment direction of the liquid crystals in the second region.

The operation of allowing the liquid crystals in the first region and the liquid crystals in the second region to form tilted angles includes the following steps: step S321, performing an optical process to a liquid crystal layer region between the first electrode and the second electrode, so that the liquid crystals in the first region form a first tilted angle in a situation of no voltage; and step S322, performing an optical process to a liquid crystal layer region between the first electrode and the third electrode, so that the liquid crystals in the second region form a second tilted angle in a situation of no voltage.

According to the manufacturing method of the liquid crystal lens provided by the third embodiment of the present disclosure, different tilted angles are predetermined at preset regions of the liquid crystal layer. In voltage driving, by the tilted angles predetermined in the first region and the second region of the liquid crystal layer and the elasticity of the liquid crystals per se, the control of the refractive index profile of the liquid crystals can be achieved. Compared with the control method only relying on the elasticity of the liquid crystals per se only, the refractive index profile of liquid crystals of the liquid crystal lens manufactured by using the method of the third embodiment of the present disclosure become smoother, so that the liquid crystal lens can have a better focusing performance.

Alternatively, in an exemplary example of the disclosure, the step S321 can further include the following steps: step 3211, applying a voltage to each of the second electrode and the first electrode, and applying a first voltage to the liquid crystal layer which is in the original state, so that liquid crystals in the liquid crystal layer tilt at the first tilted angle, in which step, the voltage applied to the second electrode is larger than the voltage applied to the first electrode, so that a voltage difference is generated between the first electrode and the second electrode; and step 3212, irradiating the liquid crystal layer region between the first electrode and the second electrode by ultraviolet light, so that the liquid crystals in the first region form the first tilted angle in the situation of no voltage.

For example, firstly, the first electrode and the second electrode are energized, the liquid crystal layer is applied with a required deviation voltage which allows the liquid crystals in the liquid crystal layer to rotate to a first pretilt angle, then the liquid crystals in other regions except the first region are sheltered from light by using a light-blocking plate or a light-shielding mask, and the liquid crystals in the first region are irradiated by a light unit emitting ultraviolet light, so that bonding reaction occurs between the reactive monomer doped in the liquid crystal molecules and the polyimide alignment layer to form a new long chain molecular structure, the direction of which is substantially the same as the orientation direction of the liquid crystals. Therefore, after the bonding and curing, the alignment function to the liquid crystals is applied. After the application of voltage is stopped, the liquid crystal molecules close to the surface of the alignment film still keep the orientation direction substantially the same as that of the cured long chain molecules, so that the liquid crystals in the first region have the first pretilt angle.

Similarly, in an exemplary example of the disclosure, the step S322 can further include the following steps: applying a voltage to each of the third electrode and the first electrode, and applying a second voltage to the liquid crystal layer which is in the original state, so that liquid crystals in the liquid crystal layer tilt at the second tilted angle, in which, the voltage applied to the third electrode is larger than the voltage applied to the first electrode, so that a voltage difference is generated between the first electrode and the third electrode; and irradiating the liquid crystal layer region between the first electrode and the third electrode by ultraviolet light, so that the liquid crystals in the second region form the second tilted angle in the situation of no voltage.

In addition, alternatively, the liquid crystal layer region between the first electrode and the third electrode (or the second electrode) can be divided into a plurality of sub-regions, and then be applied with different voltages. Such method of applying voltages can make the formed pretilt angles more accurate.

Figure 4:
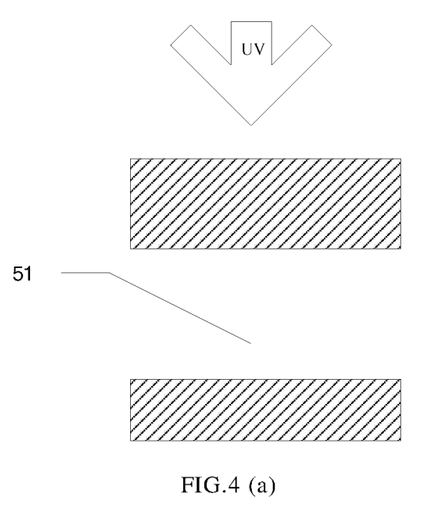
FIG. 4(a), 4(b) and 4(c) are respectively exemplary schematic views of the manufacturing method of the liquid crystal lens provided by the third embodiment of the present disclosure.

In another exemplary example of the disclosure, as illustrated in FIGS. 4(a) and (b), in a situation where the liquid crystal layer region between the first electrode and the second electrode includes at least two sub-regions, tilted angles of liquid crystals in the at least two sub-regions are different. For example, the liquid crystal layer region between the first electrode and the second electrode includes a first sub-region 51 and a second sub-region 52, the first sub-region 51 forms a first sub-tilted angle, and the second sub-region 52 forms a second sub-tilted angle.

In this case, the step S321 can further include the following steps: step S3211', applying a first sub-voltage to the liquid crystal layer which is in the original state, so that liquid crystals in the liquid crystal layer tilt at a first sub-tilted angle; step S3212', irradiating the first sub-region 51 by ultraviolet light, so that liquid crystals in the first sub-region 51 form the first sub-tilted angle; step S3213', applying a second sub-voltage to the liquid crystal layer, so that the liquid crystals in the liquid crystal layer tilt at a second sub-tilted angle; and step S3214', irradiating the second sub-region 52 by ultraviolet light, so that liquid crystals in the second sub-region 52 form the second sub-tilted angle.

For example, more particularly, firstly, the first electrode and the second electrode are energized, the liquid crystal layer is applied with a required deviation voltage which allows the liquid crystals in the liquid crystal layer to rotate to a first sub-pretilt angle; and the liquid crystals in other regions except the first sub-region 51 are sheltered from light by using a light-blocking plate or a light-shielding mask, and the liquid crystals in the first sub-region 51 are irradiated by a light unit emitting ultraviolet light, so that the liquid crystals in the first sub-region 51 have the first sub-pretilt angle. Then, the first electrode and the second electrode are energized, the liquid crystal layer is applied with a required deviation voltage which allows the liquid crystals in the liquid crystal layer to rotate to a second sub-pretilt angle; and the liquid crystals in other regions except the second sub-region 52 are sheltered from light by using a light-blocking plate or a light-shielding mask, and the liquid crystals in the second sub-region 52 are irradiated by a light unit emitting ultraviolet light, so that the liquid crystals in the second sub-region 52 have the first sub-pretilt angle.

Similarly, in a situation where the liquid crystal layer region between the first electrode and the third electrode includes at least two sub-regions, tilted angles of liquid crystals in the at least two sub-regions are different. For example, the liquid crystal layer region between the first electrode and the third electrode includes a fourth sub-region and a fifth sub-region, the fourth sub-region forms a fourth sub-tilted angle, and the fifth sub-region forms a fifth sub-tilted angle.

In this case, the step S322 can further include the following steps: applying a fourth sub-voltage to the liquid crystal layer which is in the original state, so that liquid crystals in the liquid crystal layer tilt at a fourth sub-tilted angle; irradiating the fourth sub-region by ultraviolet light, so that liquid crystals in the fourth sub-region form the fourth sub-tilted angle; applying a fifth sub-voltage to the liquid crystal layer, so that the liquid crystals in the liquid crystal layer tilt at a fifth sub-tilted angle; and irradiating the fifth sub-region by ultraviolet light, so that liquid crystals in the fifth sub-region form the fifth sub-tilted angle.

Furthermore, as illustrated in FIG. 4(c), a voltage can also be applied to an adjacent sub-region of the first region, with the voltage value of the applied voltage is slightly different from the voltages applied to the first and second sub-regions, and such detailed manner of applying a voltage can make a formed pretilt angle more accurate.

Thus, on the basis of the above steps S3211'~S3214', the embodiment can further include the following steps: step S3215', a third sub-region 53 adjacent to the first region is applied with a third sub-voltage; and step S3216', the third sub-region 53 is irradiated by ultraviolet light, so that liquid crystals in the third sub-region 53 form a third sub-tilted angle.

By applying a suitable voltage to an adjacent region of the liquid crystal layer region between the first electrode and the second electrode (or the third electrode), compared with the manner of only relying on the elasticity of the liquid crystals per se only, the adjacent region of the liquid crystal layer region between the first electrode and the third electrode (or the second electrode) can form a more accurate pretilt angle.

Similarly, in a situation where the liquid crystal layer region between the first electrode and the third electrode includes at least two sub-regions and the at least two sub-regions are applied with different sub-voltages respectively, a sixth sub-region adjacent to the second region can be applied with a sixth sub-voltage, and the sixth sub-region is irradiated by ultraviolet light, so that liquid crystals in the sixth sub-region form a sixth sub-tilted angle.

Alternatively, in an exemplary example of the disclosure, upon the optical process being performed to the liquid crystals in the first region, the liquid crystals in the first region can also react with an alignment film, so that the liquid crystals in the first region can keep the first tilted angle in a situation of no voltage.

Similarly, upon the optical process being performed to the liquid crystals in the second region, the liquid crystals in the second region can also react with an alignment film, so that the liquid crystals in the second region can keep the second tilted angle in a situation of no voltage.

Based on each of the above examples, alternatively, the step S322 of performing the optical process to the liquid crystal layer region between the first electrode and the third electrode, so that the liquid crystals in the second region form the second tilted angle in the situation of no voltage, can include the following steps: step S3221, applying a voltage to each of the third electrode and the first electrode, and applying a second voltage to the liquid crystal layer, so that liquid crystals in the liquid crystal layer tilt at the second tilted angle, in which step, the voltage applied to the third electrode is larger than the voltage applied to the first electrode, so that a voltage difference is generated between the first electrode and the third electrode; and step S3222, irradiating the liquid crystal layer region between the first electrode and the third electrode, so that the liquid crystals in the second region form the second tilted angle in the situation of no voltage.

For example, the first electrode and the second electrode are energized, the liquid crystal layer is applied with a required deviation voltage which allows the liquid crystals in the liquid crystal layer to rotate to a second pretilt angle, the liquid crystals in other regions except the second region are sheltered from light by using a light-blocking plate or a light-shielding mask, and the liquid crystals in the second region are irradiated by a light unit, so that the liquid crystals in the second region have the second pretilt angle.

Alternatively, in an exemplary embodiment, the liquid crystal layer further includes a third region below the first electrode 14, and before the liquid crystals in the first region and the liquid crystals in the second region form the tilted angles, the method further includes: allowing liquid crystals in the third region to align horizontally.

For example, the first electrode can be covered with a horizontal alignment film, and then horizontal alignment is performed to the liquid crystals in the third region, so that the liquid crystals in the third region are aligned substantially horizontally.

The above embodiments are only used to describe the present disclosure and not limitative to the present disclosure; those skilled in the relevant art can make various variations and modifications without departing from the spirit and scope of the present disclosure; therefore, all equivalent technical solutions belong to the scope of the present disclosure; the scope of the present disclosure are defined by the claims.

What is claimed is:

1. A liquid crystal lens, comprising:
an upper substrate;
a lower substrate, arranged to be opposite to the upper substrate;
a liquid crystal layer, arranged between the upper substrate and the lower substrate;
at least one first electrode, arranged at a side, close to the liquid crystal layer, of the upper substrate; and
at least one second electrode and at least one third electrode, which are arranged at a side, close to the liquid crystal layer, of the lower substrate,
wherein
the second electrode and the third electrode are adjacent to each other and both exceed the first electrode, the liquid crystal layer comprises a first region over the second electrode and a second region over the third electrode, a tilted angle of liquid crystals in the first region and a tilted angle of liquid crystals in the second region are larger than 0 degree, and an alignment direction of the liquid crystals in the first region and an alignment direction of the liquid crystals in the second region are opposite to each other; and
both the tilted angle of the liquid crystals in the first region and the tilted angle of the liquid crystals in the second region are acute angles with respect to a surface, between the first region and the second region, of the lower substrate,
wherein in an arrangement direction of the second electrode and the third electrode, a distance between the second electrode and the third electrode is greater than each of a size of the second electrode and a size of the third electrode;
liquid crystals in a region between the first region and the second region are aligned horizontally; the at least one first electrode comprises first electrodes, and the liquid crystals in a middle position of a region between adjacent ones of the first electrodes are aligned horizontally.

2. The liquid crystal lens according to claim 1, wherein the second electrode and the third electrode are directly adjacent to each other and spaced from each other, the liquid crystal lens comprises two edges which are opposite to each other, at least one second electrode is arranged at one edge of the two edges, and at least one third electrode is arranged at the other edge of the two edges.

3. The liquid crystal lens according to claim 1, wherein the tilted angle of the liquid crystals in the first region and the tilted angle of the liquid crystals in the second region range from 8 degrees to 15 degrees.

4. The liquid crystal lens according to claim 1, wherein the first region comprises a first sub-region and a second sub-region, liquid crystals in the first sub-region have a first sub-tilted angle, liquid crystals in the second sub-region have a second sub-tilted angle, and the first sub-tilted angle is different from the second sub-tilted angle; and/or
the second region comprises a fourth sub-region and a fifth sub-region, liquid crystals in the fourth sub-region have a fourth sub-tilted angle, liquid crystals in the fifth sub-region have a fifth sub-tilted angle, and the fourth sub-tilted angle is different from the fifth sub-tilted angle.

5. The liquid crystal lens according to claim 4, wherein in a situation where the first region comprises the first sub-region and the second sub-region, the first region further comprises a third sub-region which is a region adjacent to the first region, and liquid crystals in the third sub-region have a third sub-tilted angle which is different from the first sub-tilted angle and the second sub-tilted angle; and
in a situation where the second region comprises the fourth sub-region and the fifth sub-region, the second region further comprises a sixth sub-region which is a region adjacent to the second region, and liquid crystals in the sixth sub-region have a sixth sub-tilted angle which is different from the fourth sub-tilted angle and the fifth sub-tilted angle.

6. The liquid crystal lens according to claim 1, wherein an angle between the alignment direction of the liquid crystals in the first region and a length direction of an electrode ranges from 70 degrees to 90 degrees.

7. The liquid crystal lens according to claim 1, wherein the liquid crystal layer further comprises a third region below the first electrode, and liquid crystals in the third region are aligned horizontally.

8. The liquid crystal lens according to claim 1, further comprising an alignment film, wherein the alignment film covers the second electrode and the third electrode, or the alignment film covers a surface of the entire lower substrate.

9. The liquid crystal lens according to claim 1, wherein liquid crystals of the liquid crystal layer are positive liquid crystals.

10. A display device, comprising at least one liquid crystal lens according to claim 1.

11. The display device according to claim 10, wherein the display device comprises a plurality of the liquid crystal lenses, and a distance between adjacent two of the liquid crystal lenses is from 8 μm to 20 μm.

12. A manufacturing method of a liquid crystal lens, comprising:
providing an upper substrate;
providing a lower substrate arranged to be opposite to the upper substrate;
providing a liquid crystal layer between the upper substrate and the lower substrate;
forming at least one first electrode at a side, close to the liquid crystal layer, of the upper substrate;
forming at least one second electrode and at least one third electrode at a side, close to the liquid crystal layer, of the lower substrate, wherein the second electrode and the third electrode are adjacent to each other and both exceed the first electrode, the liquid crystal layer over the second electrode forms a first region, and the liquid crystal layer over the third electrode forms a second region; and
allowing liquid crystals in the first region and liquid crystals in the second region to form tilted angles larger than 0 degree, and allowing an alignment direction of the liquid crystals in the first region to be opposite to an alignment direction of the liquid crystals in the second region, which comprises: applying a first voltage so that the liquid crystals in the first region tilt at a first tilted angle which is an acute angle with respect to a surface, between the first region and the second region, of the lower substrate; and applying a second voltage so that the liquid crystals in the second region tilt at a second tilted angle which is an acute angle with respect to the surface, between the first region and the second region, of the lower substrate;

wherein allowing the liquid crystals in the first region and the liquid crystals in the second region to form tilted angles larger than 0 degree comprises:

performing an optical process to a liquid crystal layer region between the first electrode and the second electrode, so that the liquid crystals in the first region form the first tilted angle in a situation of no voltage; and performing an optical process to a liquid crystal layer region between the first electrode and the third electrode, so that the liquid crystals in the second region form the second tilted angle in a situation of no voltage; and wherein said step of forming said at least one second electrode and said at least one third electrode comprises forming said at least one second electrode and said at least one third electrode directly adjacent to each other and spaced apart from each other, wherein in an arrangement direction of the second electrode and the third electrode, a distance between the second electrode and the third electrode is greater than each of a size of the second electrode and a size of the third electrode;

liquid crystals in a region between the first region and the second region are aligned horizontally; the at least one first electrode comprises first electrodes, and the liquid crystals in a middle position of a region between adjacent ones of the first electrodes are aligned horizontally.

13. The manufacturing method according to claim 12, wherein performing the optical process to the liquid crystal layer region between the first electrode and the second electrode, so that the liquid crystals in the first region form the first tilted angle in the situation of no voltage, comprises:

applying a voltage to each of the second electrode and the first electrode, and applying the first voltage to the liquid crystal layer which is in an original state, so that liquid crystals in the liquid crystal layer tilt at the first tilted angle, wherein the voltage applied to the second electrode is larger than the voltage applied to the first electrode, so that a voltage difference is generated between the first electrode and the second electrode; and irradiating the liquid crystal layer region between the first electrode and the second electrode by ultraviolet light, so that the liquid crystals in the first region form the first tilted angle in the situation of no voltage.

14. The manufacturing method according to claim 12, wherein performing the optical process to the liquid crystal layer region between the first electrode and the third electrode, so that the liquid crystals in the second region form the second tilted angle in the situation of no voltage, comprises:

applying a voltage to each of the third electrode and the first electrode, and applying the second voltage to the liquid crystal layer which is in an original state, so that liquid crystals in the liquid crystal layer tilt at the second tilted angle, wherein the voltage applied to the third electrode is larger than the voltage applied to the first electrode, so that a voltage difference is generated between the first electrode and the third electrode; and irradiating the liquid crystal layer region between the first electrode and the third electrode by ultraviolet light, so that the liquid crystals in the second region form the second tilted angle in the situation of no voltage.

15. The manufacturing method according to claim 12, wherein in a situation where the liquid crystal layer region between the first electrode and the second electrode comprises at least two sub-regions, tilted angles of liquid crystals in the at least two sub-regions are different, the liquid crystal layer region between the first electrode and the second electrode comprises a first sub-region and a second sub-region, the first sub-region forms a first sub-tilted angle, and the second sub-region forms a second sub-tilted angle, and performing the optical process to the liquid crystal layer region between the first electrode and the second electrode, so that the liquid crystals in the first region form the first tilted angle in the situation of no voltage, comprises:

applying a first sub-voltage to the liquid crystal layer which is in an original state, so that liquid crystals in the liquid crystal layer tilt at a first sub-tilted angle; irradiating the first sub-region by ultraviolet light, so that liquid crystals in the first sub-region form the first sub-tilted angle; applying a second sub-voltage to the liquid crystal layer, so that the liquid crystals in the liquid crystal layer tilt at a second sub-tilted angle; and irradiating the second sub-region by ultraviolet light, so that liquid crystals in the second sub-region form the second sub-tilted angle;

and/or in a situation where the liquid crystal layer region between the first electrode and the third electrode comprises at least two sub-regions, tilted angles of liquid crystals in the at least two sub-regions are different, the liquid crystal layer region between the first electrode and the third electrode comprises a fourth sub-region and a fifth sub-region, the fourth sub-region forms a fourth sub-tilted angle, and the fifth sub-region forms a fifth sub-tilted angle, and performing the optical process to the liquid crystal layer region between the first electrode and the third electrode, so that the liquid crystals in the second region form the second tilted angle in the situation of no voltage, comprises:

applying a fourth sub-voltage to the liquid crystal layer which is in an original state, so that liquid crystals in the liquid crystal layer tilt at a fourth sub-tilted angle; irradiating the fourth sub-region by ultraviolet light, so that liquid crystals in the fourth sub-region form the first sub-tilted angle; applying a fifth sub-voltage to the liquid crystal layer, so that the liquid crystals in the liquid crystal layer tilt at a fifth sub-tilted angle; and irradiating the fifth sub-region by ultraviolet light, so that liquid crystals in the fifth sub-region form the fifth sub-tilted angle.

16. The manufacturing method according to claim 15, wherein in a situation where the at least two sub-regions between the first electrode and the second electrode are applied with different sub-voltages respectively, a third sub-region adjacent to the first region is applied with a third sub-voltage, and the third sub-region is irradiated by ultraviolet light so that liquid crystals in the third sub-region form a third sub-tilted angle; and in a situation where the at least two sub-regions between the first electrode and the third electrode are applied with different sub-voltages respectively, a sixth sub-region adjacent to the second region is applied with a sixth sub-voltage, and the sixth sub-region is irradiated by ultraviolet light so that liquid crystals in the sixth sub-region form a sixth sub-tilted angle.

17. The manufacturing method according to claim 12, wherein upon the optical process being performed to the liquid crystals in the first region, the liquid crystals in the first region are allowed to react with an alignment film, so that the liquid crystals in the first region are capable of keeping the first tilted angle in a situation of no voltage; and upon the optical process being performed to the liquid crystals in the second region, the liquid crystals in the second region are allowed to react with an alignment film, so that the liquid crystals in the second region are capable of keeping the second tilted angle in a situation of no voltage.

18. The manufacturing method according to claim 12, wherein performing the optical process to the liquid crystal layer region between the first electrode and the third electrode, so that the liquid crystals in the second region form the second tilted angle in the situation of no voltage, comprises:

applying a voltage to each of the third electrode and the first electrode, and applying the second voltage to the liquid crystal layer, so that liquid crystals in the liquid crystal layer tilt at the second tilted angle, wherein the voltage applied to the third electrode is larger than the voltage applied to the first electrode, so that a voltage difference is generated between the first electrode and the third electrode; and irradiating the liquid crystal layer region between the first electrode and the third electrode, so that the liquid crystals in the second region form the second tilted angle in the situation of no voltage.

19. The manufacturing method according to claim 12, wherein the liquid crystal layer further comprises a third region below the first electrode, and before the liquid crystals in the first region and the liquid crystals in the second region form the tilted angles, the method further comprises: allowing liquid crystals in the third region to align horizontally.

* * * * *